W. P. HAMMOND.
GLASS COVERED DASHBOARD FOR AUTOMOBILES.
APPLICATION FILED NOV. 1, 1917.
1,296,182.
Patented Mar. 4, 1919.
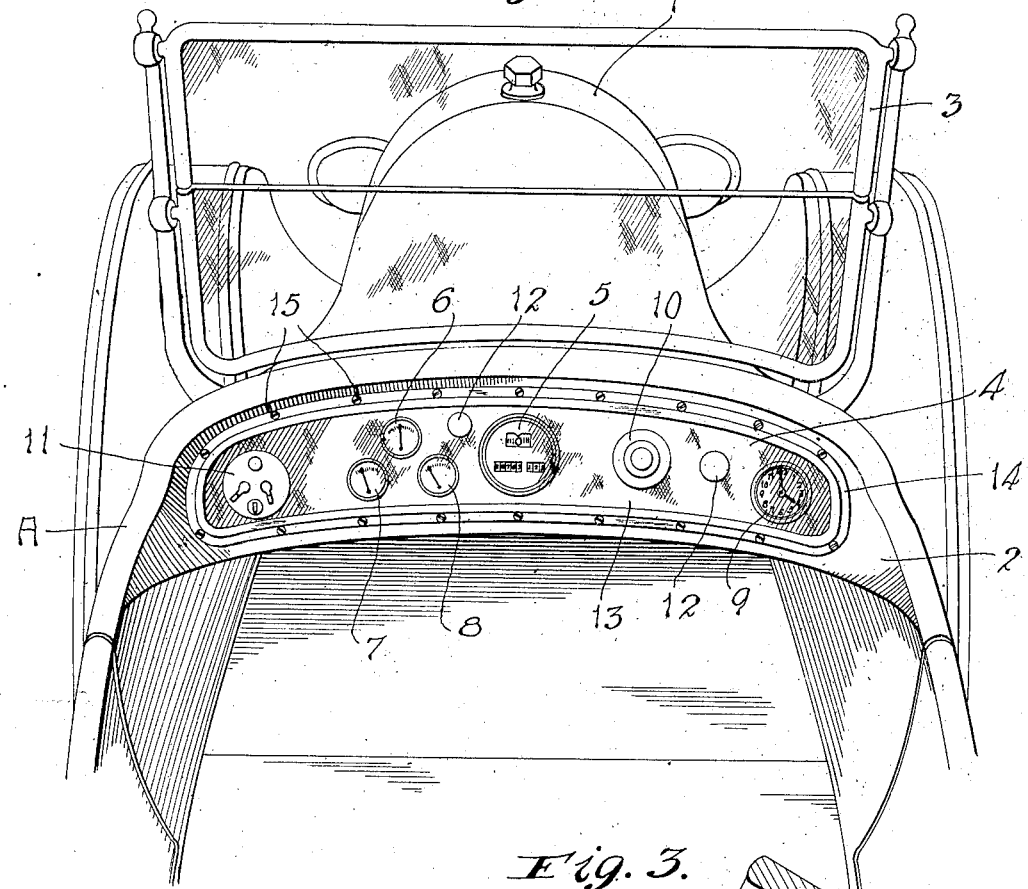
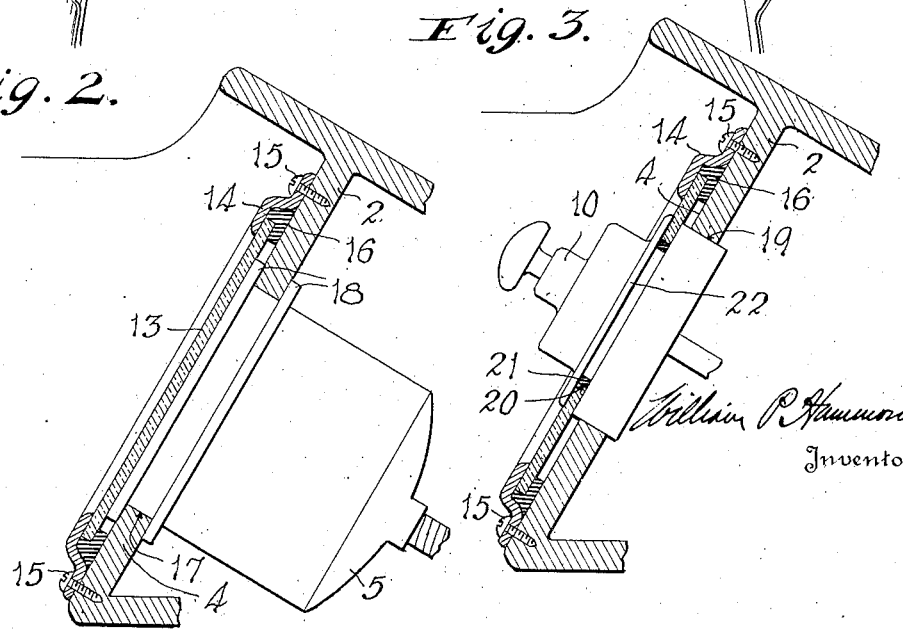
William P. Hammond,
Inventor

UNITED STATES PATENT OFFICE.

WILLIAM P. HAMMOND, OF PASSAIC, NEW JERSEY.

GLASS-COVERED DASHBOARD FOR AUTOMOBILES.

1,296,182.  Specification of Letters Patent.  Patented Mar. 4, 1919.

Application filed November 1, 1917. Serial No. 199,735.

*To all whom it may concern:*

Be it known that I, WILLIAM P. HAMMOND, a citizen of the United States, residing in Passaic, county of Passaic, and State of New Jersey, have invented certain new and useful Improvements in Glass-Covered Dashboards for Automobiles, of which the following is a specification.

The present invention relates to certain new and useful improvements in motor vehicles, and more particularly to an instrument board for automobiles, one object of the invention being to provide a construction for instrument boards in which all of the measuring and indicating instruments are covered and protected by a single transparent plate, thus obviating the necessity of providing an independent crystal or glass and corresponding bezel for each individual instrument.

Further objects of the invention are to provide an instrument board which has a continuous and smooth surface and through which the faces of the instruments are clearly visible, which will collect a minimum amount of grease and dust, which can be easily cleaned, which affords a maximum amount of protection to the instruments, and which is comparatively simple and inexpensive in its construction.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a perspective view of the front portion of a conventional automobile looking from the inside thereof, showing an instrument board constructed in accordance with the invention applied to the dashboard thereof.

Fig. 2 is an enlarged transverse sectional view through the instrument board, showing the manner of mounting the measuring and indicating instruments.

Fig. 3 is a similar view showing the manner of mounting the operating instruments, such as the dashboard pump and switch box.

Corresponding and like parts are referred to in the following description and indicated in all the views of the drawings by the same reference characters.

Referring to the drawings, the reference character A designates the front portion of the body of a conventional automobile which is provided with the usual engine hood 1, dashboard 2, and wind shield 3. An instrument board 4 constructed in accordance with the invention is shown as arranged upon the dashboard 2, the said instrument board being shown as including the usual measuring and indicating instruments, such as the speedometer and odometer 5, the ammeter 6, the oil pressure gage 7, the gasolene pressure gage 8, and clock 9, as well as the conventional operating instruments, such as the dashboard pump 10, switch box 11, and instrument board lamps 12 for illuminating the various instruments at night. A comparatively thick transparent plate 13 extends completely over the instrument board 4, said plate being of any suitable material such as glass, and being secured in position by any desirable means, such as the binding or clamping frame 14, which extends around the edges of the plate 13, the inner edge of which overlaps the edges of the plate 13, while the outer edge thereof is secured to the dashboard 2 by suitable fastening members such as the screws 15. A flexible or rubber frame 16 is interposed between the plate 13 and dashboard 2, as well as between the edges of the plate and clamping frame 14, said rubber frame serving to take up the shocks and vibrations of the automobile and prevent cracking of the transparent plate 13.

Slightly different modes of mounting the measuring and indicating instruments and operating instruments must be utilized because of the fact that the indicating instruments, such as the speedometer, must be covered and protected by the plate 13, while the operating instruments such as the switch box must extend through the plate 13 so as to be easily accessible for operation. Fig. 2 of the drawing illustrates one manner of mounting the indicating and measuring instruments, while Fig. 3 illustrates one possible mounting for the operating instruments. The mounting of each measuring instrument will be substantially the same, so the manner of mounting only one is illustrated and described, in the present instance, the speedometer, and the same is true of the operating instruments, the dashboard pump only being illustrated.

In the case of the measuring instruments, as indicated by Fig. 2, where it is not only necessary but desirable to cover the face of the instrument, the instrument is securely mounted in an opening 17 in the dashboard 2 made to fit the particular instrument, the face or dial of the instrument being visible from the front of the instrument board. Flanges or collars 18 may be provided for clamping the instrument in position, the outer flange also providing a bearing for the plate 13 and an ornamental frame for the face of the instrument. The plate 13 is fitted over the faces of all of the measuring instruments, and completely covers and protects the same, the necessity of providing the usual independent crystals and bezels for holding the same in position being obviated.

In mounting the operating instruments an opening 19 is formed in the dashboard 2 for each instrument exactly as previously described, and an opening 20 slightly larger than the diameter of the instrument to be fitted in it is drilled in the transparent plate 13 for each instrument. The instruments are inserted through the openings in the dashboard and plate 13, and a flexible spacing ring 21 which may be formed of any resilient material such as rubber, is interposed between each instrument and the edges of the openings in the plate 13 to take up vibrations and prevent injury to the instrument or plate 13. A flange or collar 22 may be fitted upon each instrument against the plate 13 to cover the openings 20 in the same and to provide a neat appearance.

With this construction it will be seen that a highly pleasing and desirable instrument board is provided, which fully accommodates each of the instruments, covering and protecting the delicate measuring and indicating instruments, and at the same time providing an accessible and neat arrangement of the operating instruments. The conventional individual crystals and bezels for each instrument are eliminated, and the entire instrument board can be thoroughly cleaned by simply rubbing a cloth once or twice over the transparent plate 13, instead of it being necessary to carefully rub around each individual bezel, as is the case with the construction of instrument boards now in use. The application of the instruments to or removal thereof from the instrument board are not hindered in any manner, but rather facilitated, while the construction is such that the invention can be easily applied to any type of automobile.

Having thus described the invention, what I claim as new and desire to secure by Letters Patent, is:—

1. The combination with an instrument board for vehicles, of a series of instruments mounted upon the board and having flat faces which are substantially flush with the face of the board, and a continuous sheet of transparent material applied to the face of the instrument board and extending over the faces of all of the said instruments so as to protect the same, the faces of the instruments being visible through the transparent sheet.

2. The combination with an instrument board for vehicles, said board having a series of openings therein, instruments fitted within the openings and having flanged faces which engage the peripheries thereof, and a continuous sheet of transparent material applied to the face of the instrument board and extending over the flanged faces of all of the said instruments so as to protect the same, the faces of the instruments being visible through the transparent sheet.

3. The combination with an instrument board for vehicles, of a series of instruments mounted upon the board and having flat faces which are substantially flush with the face of the board, a continuous sheet of transparent material applied to the face of the board and extending over the faces of all of the said instruments, a fastening frame engaging the periphery of the transparent sheet and detachably secured to the instrument board, and packing at the edges of the transparent sheet.

4. The combination with an instrument board for vehicles, of a series of indicating and operating instruments mounted upon the board, the indicating instruments being substantially flush with the board while the operating instruments project therefrom, and a continuous sheet of transparent material fitted against the face of the instrument board, said transparent sheet extending over the indicating instruments and having openings cut therein to receive the projecting portions of the operating instruments.

5. The combination with an instrument board for vehicles, of indicating and operating instruments mounted upon the board, the faces of the indicating instruments being substantially flush with the face of the board while the operating instruments project therefrom, and a continuous sheet of transparent material applied to the face of the instrument board and extending over the entire area thereof within which the instruments are assembled, said transparent sheet fitting over the faces of the indicating instruments and being formed with openings receiving the projecting portions of the operating instruments, packing between the edges of the said openings and the instruments, and packing between the edges of the transparent sheet and the instrument board.

6. The combination with an instrument board for vehicles, of indicating and operating instruments mounted thereon, the faces of the indicating instruments being flush with the face of the board while the operating instruments project therefrom, a continuous sheet of transparent material extending over the entire area of the instrument board within which the instruments are assembled and fitting closely against the flat faces of the indicating instruments, said transparent sheet being formed with openings through which the operating instruments project, packing interposed between the edges of the said openings and the operating instruments, a flanged clamping frame extending around the periphery of the transparent sheet of material and detachably secured to the instrument board, and a peripheral line of packing extending around the edges of the transparent sheet.

WILLIAM P. HAMMOND.